(12) United States Patent
Liu et al.

(10) Patent No.: US 6,611,389 B1
(45) Date of Patent: Aug. 26, 2003

(54) METHOD OF DETERMINING THE VARIATION OF THE CLEARANCE BETWEEN A MAGNETIC TRANSDUCER AND A RECORDING MEDIA DURING TRACK SEEKING

(75) Inventors: Bo Liu, Singapore (SG); Qisuo Chen, Singapore (SG)

(73) Assignee: Data Storage Institute (SG)

( * ) Notice: Subject to any disclaimer, the term of this patent is extended or adjusted under 35 U.S.C. 154(b) by 0 days.

(21) Appl. No.: 09/414,385

(22) Filed: Oct. 7, 1999

(30) Foreign Application Priority Data

Dec. 9, 1998 (SG) .............................................. 9804259

(51) Int. Cl.[7] .............................................. G11B 27/36
(52) U.S. Cl. ........................ 360/31; 360/75; 360/78.04; 324/212
(58) Field of Search ............................. 360/75, 31, 25, 360/78.04; 324/212

(56) References Cited

U.S. PATENT DOCUMENTS

| | | | |
|---|---|---|---|
| 4,777,544 A | 10/1988 | Brown et al. | 360/75 |
| 4,872,071 A | 10/1989 | Easton et al. | 360/31 |
| 5,130,866 A | 7/1992 | Klaassen et al. | 360/75 |
| 5,168,413 A * | 12/1992 | Coker et al. | 360/137 |
| 5,831,781 A | 11/1998 | Okamura | 360/31 |
| 5,909,330 A * | 6/1999 | Carlson et al. | 360/31 |
| 5,991,113 A * | 11/1999 | Meyer et al. | 360/75 |
| 6,088,176 A * | 7/2000 | Smith et al. | 360/46 |
| 6,288,856 B1 * | 9/2001 | Ottesen et al. | 360/31 |

FOREIGN PATENT DOCUMENTS

| | | |
|---|---|---|
| EP | 0 467 615 A2 | 1/1992 |
| WO | WO 98/26411 | 6/1998 |

* cited by examiner

*Primary Examiner*—David Hudspeth
*Assistant Examiner*—Dan I. Davidson
(74) *Attorney, Agent, or Firm*—Brian R. Coleman; Perkins Coie LLP

(57) ABSTRACT

A method of determining a clearance between a magnetic transducer and a magnetic recording medium during a track seeking operation, the magnetic recording medium being moveable with respect to the transducer and including at least a test track and a reference track, which method comprises the steps of: at least partially erasing a predetermined area of the recording medium including at least one test track and one reference track; writing a first series of predetermined magnetic transitions along a spiral trace, formed by seeking operation of the transducer, on the at least one test track in the predetermined area; reading the test track and obtaining a pulse width of signals read back from the test track (test track pulse width) at a predetermined amplitude level; writing a further series of predetermined magnetic transitions identical to the first series on a reference track of the recording medium in the predetermined area; reading the reference track and obtaining, a pulse width of signals read back from the reference track (reference track pulse width) at the predetermined amplitude level; and calculating the difference between the test track pulse width and the reference track pulse width, said difference being indicative of the clearance between the magnetic transducer and the magnetic recording medium during track seeking.

23 Claims, 3 Drawing Sheets

METHOD OF DETERMINING THE VARIATION OF THE CLEARANCE BETWEEN A MAGNETIC TRANSDUCER AND A RECORDING MEDIA DURING TRACK SEEKING

CLAIM FOR PRIORITY

This patent application claims priority under 35 U.S.C. §119 from Singapore Patent Application No. 9804259-1, filed Dec. 9, 1997, which is incorporated herein by reference for all purposes.

THIS INVENTION relates to a method of determining a clearance variation between a magnetic transducer and a magnetic recording medium during a track seeking operation.

Further, this invention relates to moving storage apparatus of the type in which a read/write transducer head supported on a slider is in contact with the storage medium when at rest and "flies" above the medium surface when the medium is moving at operating speed, and more particularly to a method and apparatus for measuring the flying height of the transducer over the medium during track seeking operations. Experimental results have revealed a body of evidence that the track seeking operation causes loss/gain of head-disk clearance and sometimes results in slider-disk impact during the track seeking operation. This flying instability of the head may cause disk drive failure.

During track seeking operations, the seeking velocity, acceleration and deceleration are high and it is not easy to monitor the head-disk clearance variation with a conventional flying height tester which measures the head-disk clearance when the head is in a static position flying over the same track. It is difficult to study the influence that the track seeking operation has on flying height.

As the storage capacity of magnetic recording disks is increased by reducing track width, transition length and head-disk clearance, the heads must fly closer and closer to the recording surface in order to maintain adequate signal strength and to achieve a better signal-to-noise ratio. If the head contacts the recording surface while the disk is moving, the resultant "head-disk crash" can wipe out previously recorded data, cause weariness and head gimbal assembly (HGA) damage, damage the recording surface, and/or the slider surface on which the head is mounted.

Proximity recording technology is being used in disk drive design and has pushed head-disk clearances to a level of 0.6 to 1.2 $\mu$in range. Furthermore, in proximity recording, the amount of contamination build-up on a slider surface and the slider's flying performance are very sensitive to the assembly accuracy, air bearing surface design and dynamic performance of the head-gimbal assembly. Therefore, it is important to have a testing technique which can reveal the dynamic performance of the head-gimbal assembly (HGA) of a disk drive.

This invention provides a simple in-situ recording and testing technique for the measurement of head-disk clearance variation during the track seeking operation. The technique can be used easily, and the results can be used to characterise the dynamic performance of the HGA after assembly and also to characterise the performance of the track seeking process.

Known methods for measuring flying height have included various capacitive and optical techniques which require special "test" disks or sliders. These methods are unable to measure the head-disk clearance in-situ or in a direct manner. The clearance between real sliders and disks is inferred from the measurements from the "test" sliders or disks. These methods have been suitable up to the present. However, these methods lack the capability of in-situ measurement, especially at disk drive level.

U.S. Pat. No. 4,872,071 describes a method and apparatus for detecting abnormal operation of a magnetic disk file by reading data from a predetermined read-only area of each track. The amplitude of these readback signals is compared with the amplitude of similar signals readback from other tracks. If the comparison indicates a predetermined degree of variation, an alarm is given so that corrective action can be taken to avoid an impending head crash.

U.S. Pat. No. 4,777,544 describes another method and apparatus of incidental interest which uses the Wallace equation which expresses the dependence of readback voltage on various recording parameters including head/disk spacing and the use of a harmonic ratio flying height circuit to measure head/disk clearance in-situ. It is directed essentially to the measurement of the average flying height along a track, and the use of that information during the manufacture of the drive.

U.S. Pat. No. 5,130,866 describes a method and circuitry to sense the clearance between a magnetic transducer and recording medium by pre-writing magnetic transitions on a pre-selected area of the media and obtaining a readback signal therefrom. The pulse width of the readback signal is sensed at a pre-selected percentage of its base-to-peak amplitude. A voltage proportional to the width of the readback signal provides a measurement of the clearance.

So far, all existing techniques for head-disk clearance measurement are based on the reading operation of the system and assume that the flying height is the same during the writing operation.

No known techniques provide a simple and practical method of recording magnetically the spacing between a magnetic transducer and the recording medium in-situ in a direct manner at disk drive level during the track seeking operation.

It is, therefore, an object of the present invention to provide a method for measuring the clearance variation between a magnetic transducer and a recording medium in-situ in a direct manner in an operational magnetic disk storage system during track seeking operations.

Accordingly, one aspect of the present invention provides a method of determining a clearance variation between a magnetic transducer and a magnetic recording medium during a track seeking operation, the magnetic recording medium being moveable with respect to the transducer, which method comprises the steps of: at least partially erasing a predetermined area of the recording medium including at least one test track and one reference track; writing a series of predetermined magnetic transitions along a spiral trace formed by the read/write head during its track seeking across the predetermined area; reading the test track and obtaining, from the signals readback from the test tracks, the pulse width of the readback signal at a predetermined amplitude level; writing a further series of predetermined magnetic transitions identical to the first series on the reference tracks of the recording medium in the predetermined area; reading the reference track and obtaining, from the signals readback from the reference track, the pulse width of the readback signal at the predetermined amplitude level; and the pulse width difference being indicative of the clearance change caused by track seeking operations.

A further aspect of the present invention provides a method of determining a clearance between a magnetic transducer and a magnetic recording medium during a track seeking operation, the magnetic recording medium being moveable with respect to the transducer and including at least a test track and a reference track, which method comprises the steps of: pre-recording a series of predetermined magnetic transitions on a predetermined area of the recording medium including at least one test track and one reference track; at least partially erasing the magnetic transitions along the recorded tracks of the recording medium at a predetermined erasing current during track seeking across the predetermined area, the effect of the partial erasing being sensitive to changes of the head-disk clearance during track seeking; reading the test track and obtaining, from the signals readback from the test track, residual amplitude of a partially erased part of the test track; writing a reference track, obtaining the amplitude of the reference track, erasing the magnetic transitions on the reference track at the same predetermined partial erasing current; reading the reference track and obtaining, from the signals readback from the reference track, an average residual reference track amplitude; and comparing the residual amplitude from the partially erased part and the residual reference amplitude, said comparison being indicative of the change of the clearance between the magnetic transducer and the magnetic recording medium caused by track seeking operations.

In order that the present invention may be more readily understood, embodiments thereof will now be described, by way of example, with reference to the accompanying drawings, in which.

Examples of the present invention are described as applied to a magnetic disk storage apparatus, but it will be clear to those skilled in the art that the invention is also applicable to other mechanically moving magnetic storage apparatus.

Figure 1:
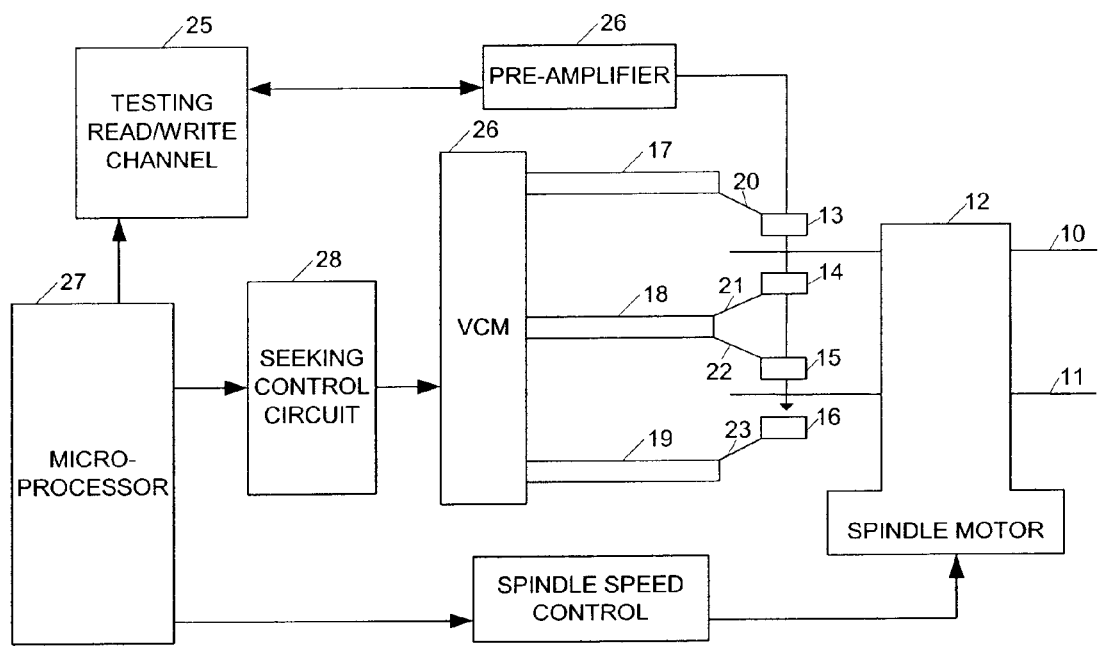
FIG. 1 is a simplified schematic block diagram of a disk drive embodying the present invention.

In a magnetic disk drive as shown in FIG. 1, a plurality of rigid rotatable disks 10, 11 are supported on a spindle 12 and rotated by a disk drive spindle motor 1. Both sides of each disk 10,11 are provided with magnetic recording medium in the form of an annular pattern of concentric data tracks having an inner diameter and an outer diameter.

The sliders are moved radially in and out so that the heads may access different portions of the disk surfaces containing the data recording tracks. Four sliders 13,14,15,16 each support a read/write head and are each attached to an actuator arm 17,18,19 by means of a respective suspension and gimbal arrangement 20,21,22,23. The suspension and gimbal provide a slight spring force which biases the sliders against the disk surfaces with a loading force. Each actuator arm is attached to a voice coil motor (VCM) 24. The VCM 24 is a coil moveable within a fixed magnetic field. The direction and velocity of the coil movement is controlled by the current supplied.

During operation of the disk drive, the rotation of the disks 10,11 generates an air bearing between the sliders 13,14,15,16 and the disks. This air bearing counterbalances the slight spring force of the suspensions and gimbals arms and supports the sliders above the disk surfaces during operation.

Data read/write channels 25 for the disk drive embodying the invention are illustrated in FIG. 1. As the disks 10,11 are rotated, magnetic data is written and read by the read/write heads carried by the sliders 13,14,15,16. The readback signal from the heads are first amplified in the pre-amplifier 26 which is part of the arm electronics and is then processed by the read/write channel 25. The pre-amplifier 26 is also used to read servo signals obtained from the data recording medium surface in order to determine the location of the read/write head (transducer head) and to provide information concerning the speed of rotation. A servo control circuit 28 controlled by a microprocessor 27 receives the servo information through the read/write channel 25 and the pre-amplifier 26 and produces a position error signal which is used to control the VCM 24 and thence the track seeking and track locating operations of the respective transducer heads on the sliders 13,14,15,16. Preferably, the transducer head on the slider 13 comprises a testing head and the surface of the disk 10 adjacent transducer head 13 comprises the testing surface which is used to record the head/disk clearance variation during the track seeking operation. The read/write channel 25 may include a specific testing read/write channel to which the testing data from the transducer head on the slider 13 is sent.

Methods embodying the present invention involve three basic stages: firstly, preparing the initial status of the magnetic recording medium; secondly, writing or erasing transition information during a track seeking operation; and thirdly writing or erasing transition information at reference tracks and obtaining readback information from both test tracks and reference tracks on the magnetic recording medium.

Two methods are described for the measurement of the clearance variation between the magnetic transducer head and the moving magnetic recording medium.

In the first method, all the data tracks of the data zones or sectors on the testing surface of the test disk 10 are DC erased. The data tracks on the disk surface are divided into test tracks 30 and reference tracks 31. Each test track is adjacent to a reference track such that the concentric tracks alternate from a test track 30 to a reference track 31 from the inner circumference of the disk 10 to the outer. The microprocessor 27 instructs the VCM 24 to initiate a track seeking operation by sending a seeking start signal. The seeking start signal triggers a write gate to open and initiates movement of the magnetic transducer head across the rotating disk surface thereby describing a spiral path 32 over the disk surface and across the test tracks 30 and the reference tracks 31. The opening of the write gate also triggers the writing of a first series of predetermined magnetic transitions onto the disk surface by the magnetic transducer head. The magnetic transitions comprise a series of isolated pulses at a predetermined frequency, the transitions thereby being equidistantly spaced along the spiral path 32 of the transducer head sweeping across the disk surface 10. Once the track seeking operation has been completed, the microprocessor will send a seeking end signal which will close the write gate thereby stopping the writing of the isolated pulses to the disk surface.

Figure 4:
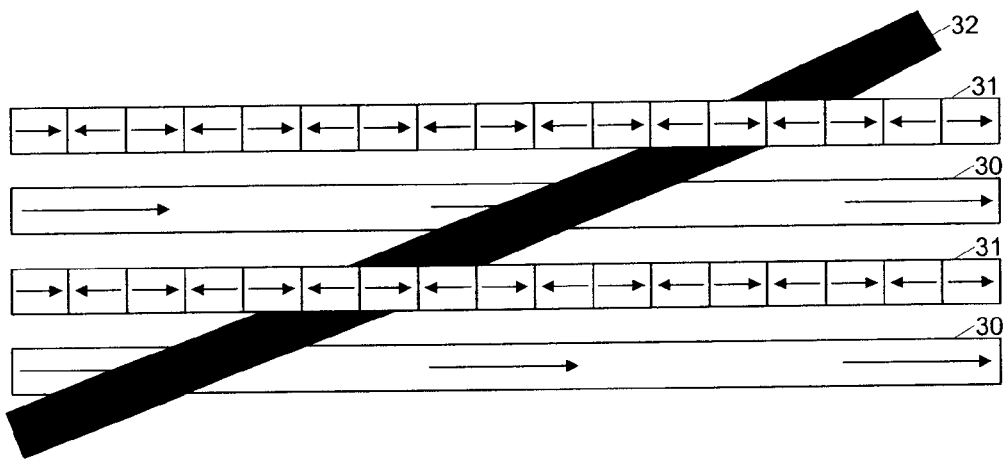
FIG. 4 is a schematic diagram of a portion of the magnetic recording medium during a method embodying the present invention.

The effect of writing the isolated pulses to the disk surface during the track seeking operation can be seen schematically in FIG. 4. As the transducer head sweeps across respective test tracks 30, the isolated pulses are recorded on each respective test track. The test tracks 30 can now be read by the magnetic transducer head after track seeking operation and the readback signals are analyzed. The variation of the clearance between the magnetic transducer head and the magnetic recording medium is quantifiable by measuring the variation in the pulse width of the signals readback from the test tracks 30. It will be appreciated that techniques for quantifying the clearance in relation to variations in the pulse width of a readback signal are well-known to a person skilled in the art.

Subsequently, a further series of predetermined magnetic transitions identical to the first series written during the track seeking operation are written on each of the reference tracks 31. As can be seen in FIG. 4, in some circumstances this overwrites the information written by the transducer head during the track seeking operation.

The reference tracks 31 are then read to provide the pulse width of the signals readback from the reference tracks 31.

Figure 2:
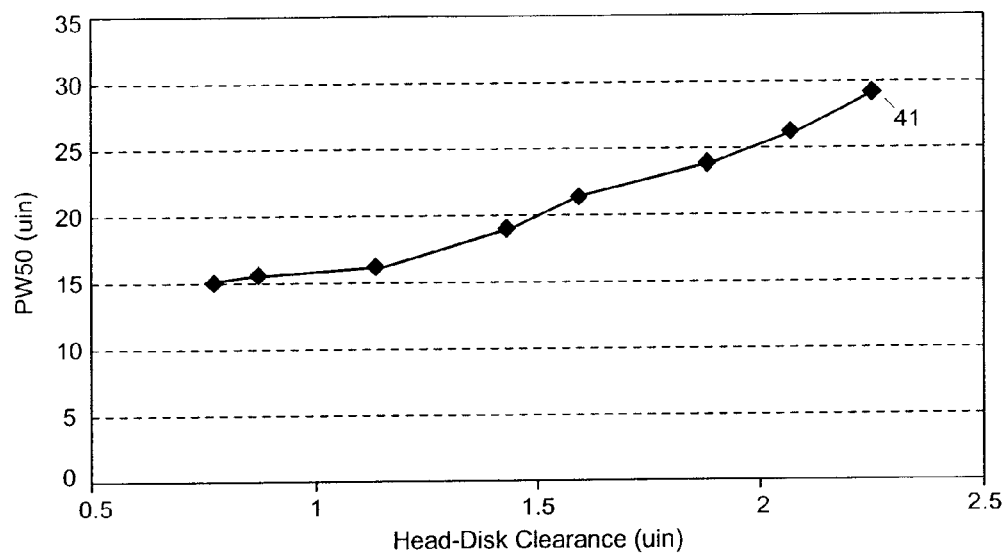
FIG. 2 is a graph showing the relationship between pulse width and the clearance between a magnetic transducer and a magnetic recording medium.

By comparing the pulse widths of the signals readback from the test tracks 30 and those readback from the reference tracks 31, the change in clearance caused by seeking operation can be obtained. FIG. 2 shows the substantially linear relationship between the clearance and the pulse width of a signal read at 0.8 μin. The pulse width is evaluated at a predetermined amplitude which, in the case shown in FIG. 2, is 50% of the base to peak amplitude of the readback signal. Preferably, the write current used to write the isolated pulses during the track seeking operation and along the reference tracks 31 is in the range of 05 to 30 mA.

Another method embodying the present invention is, to a certain extent, the reciprocal of the process outlined above. In the second method, the surface of the magnetic recording medium is prepared by pre-recording transitions with a predetermined frequency over all test tracks 30 and reference tracks 31. The isolated transitions are written using a predetermined saturating write current.

The microprocessor 27 initiates a track seeking operation which triggers the transducer head to partially erase with a predetermined erasing current any transition lying under the spiral path 32 which the transducer head describes as it moves across the disk surface 10. In this manner, the erasing path 32 of the transducer head partially erases parts of the adjacent test tracks and reference tracks. When the track seeking operation is finished, the transducing head ceases to erase.

The test tracks 30 are then read by the transducer head, especially those areas which were erased by the transducer head as the path 32 cut across the respective test tracks 30. The residual amplitude of the erased parts of the test tracks is measured from the readback signal from the test tracks.

Figure 3:
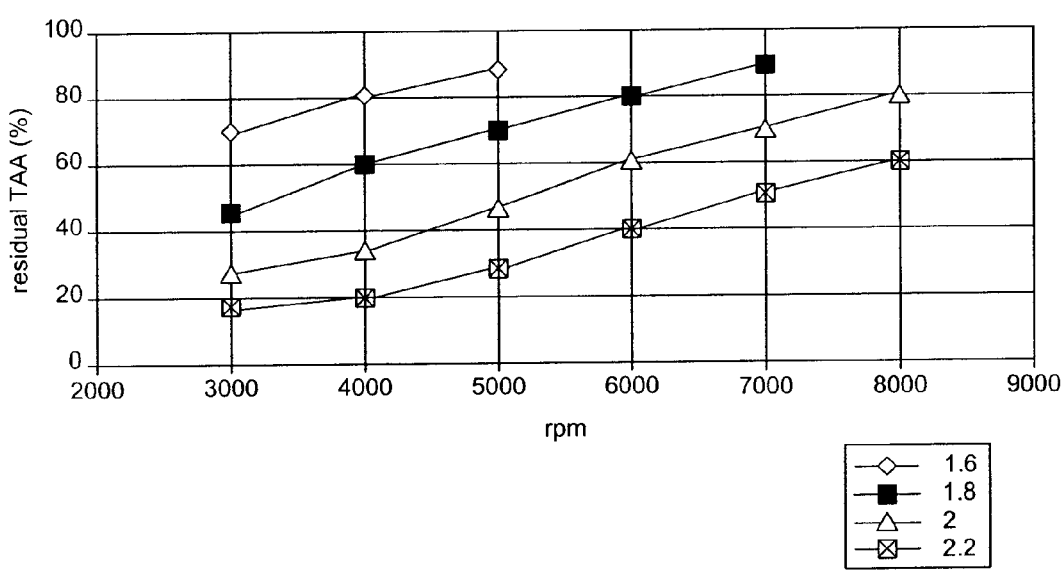
FIG. 3 is a graph of residual readback amplitude after an erasing process as a percentage of the amplitude before the erasing process and the spindle rotating speed at different erase currents.

Referring to FIG. 3, it should be noted that the residual amplitude as a percentage of the amplitude before the partial erasing process bears a strong linear relationship to the speed of rotation of the disk, the clearance being linearly related to the spindle speed. The erasing current is selected to be sensitive to changes in the head-disk clearance so that the amount of amplitude loss due to the erasure along the path 32 will be different at different head-disk clearances.

Figure 5:
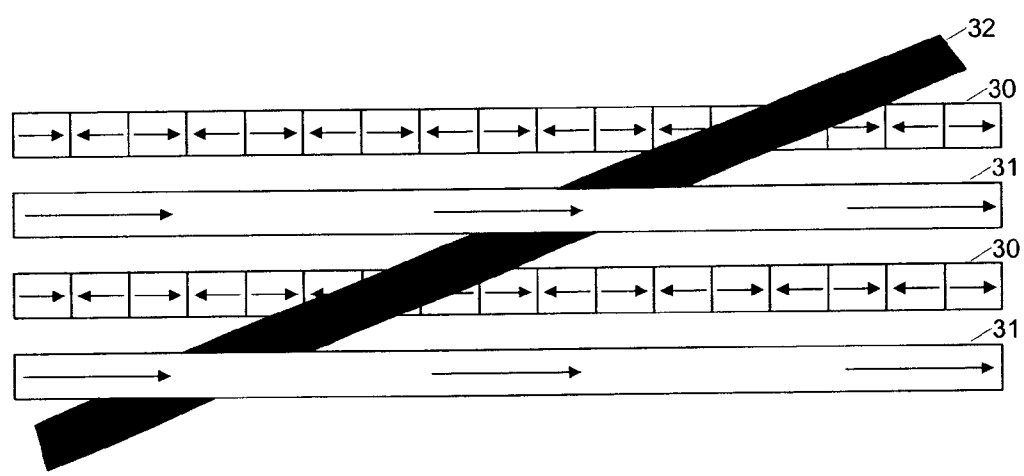
FIG. 5 is a schematic diagram of a portion of the magnetic recording medium during another method embodying the present invention.

Subsequently, the same erasing current is applied along all the reference tracks 31 (as shown in FIG. 5). The residual amplitude of the reference tracks 31 is then measured by reading back signals from the reference tracks 31. By comparing the differences in the amplitudes of the reference tracks and the residual amplitude of erased portions of the test tracks 30, the head-disk clearance variation during the track seeking operation can be calculated.

Advantageously, the erasing current is in the range from 0.5 mA to 12 mA.

The above two methods are based on the principle of using a writing operation rather than a reading operation in order to record and detect the disk-head clearance variation. The reading steps performed in the above two examples are purely for the detection of the pulse width of a remaining signal or the residual amplitude of a remaining signal at the erased part. The methods according to the present invention thereby benefit from the following advantages:

The variation in the pulse width caused by the writing operation is permanent and can record the variations in head-disk clearance during track seeking operations.

The recordal of the information derived from the test tracks and the reference tracks can be easily post-processed.

The methods of the present invention allow an easy comparison between the information derivable from the reference tracks with that derivable from the test tracks.

It is also possible by comparing the residual amplitude of a track after erasing with the amplitude of the track before erasing to provide a measurement of clearance which is independent of the relative velocity between the magnetic transducer head and the magnetic recording medium. Preferably, the residual track average amplitude after erasing is from 10% to 90% of the track average amplitude before erasing.

What is claimed is:

1. A method of determining a clearance between a magnetic transducer and a magnetic recording medium during a track seeking operation, the magnetic recording medium being moveable with respect to the transducer and including at least a test track and a reference track, which method comprises the steps of: at least partially erasing a predetermined area of the recording medium including at least one test track and one reference track; writing a first series of predetermined magnetic transitions along a spiral trace, formed by seeking operation of the transducer, on the at least one test track in the predetermined area; reading the test track and obtaining a pulse width of signals read back from the test track (test track pulse width) at a predetermined amplitude level; writing a further series of predetermined magnetic transitions identical to the first series on a reference track of the recording medium in the predetermined area; reading the reference track and obtaining a pulse width of signals read back from the reference track (reference track pulse width) at the predetermined amplitude level; and calculating the difference between the test track pulse width and the reference track pulse width, said difference being indicative of the clearance between the magnetic transducer and the magnetic recording medium during track seeking.

2. A method according to claim 1, wherein the predetermined amplitude level at which the respective pulse widths of the readback signals are calculated comprises a preselected percentage of a reference amplitude, the reference amplitude being the base to peak amplitude of the reference signals.

3. A method according to claim 2, wherein the preselected percentage is 50% of the reference amplitude.

4. A method according to claim 1, wherein the series of predetermined magnetic transitions comprises a series of isolated pulses or a high frequency sinewave.

5. A method according to claim 1, wherein the magnetic transitions are equidistant from one another and identical to one another.

6. A method according to claim 1, wherein the magnetic transitions are recorded at a predetermined frequency.

7. A method according to claim 1, wherein the movement of the magnetic transducer with respect to the magnetic recording medium describes a spiral path across the magnetic recording medium.

8. A method according to claim 1, wherein the predetermined area includes a plurality of reference tracks and test tracks.

9. A method according to claim 8, wherein the reference tracks alternate with respect to test tracks across the magnetic recording medium.

10. A method according to claim 1, wherein the at least one reference track is adjacent the at least one test track.

11. A method according to claim 1, wherein the step of at least partially erasing comprises the step of DC erasing.

12. A method of determining a clearance between a magnetic transducer and a magnetic recording medium during a track seeking operation, the magnetic recording medium being moveable with respect to the transducer and including at least a test track and a reference track, which method comprises the steps of: pre-recording a series of predetermined magnetic transitions on a predetermined area of the recording medium including at least one test track and one reference track; partially erasing the magnetic transitions on the test track of the recording medium with a predetermined erasing current during track seeking across the predetermined area; the erasing current being selected so that a residual amplitude of the erased magnetic transitions on the test track is sensitive to changes in the clearance during track seeking; reading the test track and obtaining, from the signals readback from the test track, a residual test track amplitude of an erased part of the test track; partially erasing the magnetic transitions on the reference track at the predetermined erasing current; reading the reference track and obtaining, from the signals readback from the reference track, an average residual reference amplitude; and comparing the residual test track amplitude and the average residual reference amplitude, said comparison being indicative of the change of the clearance between the magnetic transducer and the magnetic reading medium during track seeking.

13. A method according to claim 12, wherein the erasing current is in the range of 0.5 mA to 12 mA.

14. A method according to claim 12, wherein the residual test track amplitude is compared with the average residual reference amplitude or the original average test track amplitude of the track before erasing to provide a measurement of clearance that is independent of the relative velocity between the magnetic transducer and the magnetic reading medium.

15. A method according to claim 14, wherein the average residual track amplitude after erasing comprises between 10 to 90% of the residual track amplitude before erasing.

16. A method according to claim 12, wherein the series of predetermined magnetic transitions comprises a series of isolated pulses or a high frequency sinewave.

17. A method according to claim 12, wherein the magnetic transitions are equidistant from one another and identical to one another.

18. A method according to claim 12, wherein the magnetic transitions are recorded at a predetermined frequency.

19. A method according claim 12, wherein the movement of the magnetic transducer with respect to the magnetic recording medium describes a spiral path across the magnetic recording medium.

20. A method according to claim 12, wherein the predetermined area includes a plurality of reference tracks and test tracks.

21. A method according to claim 20, wherein the reference tracks alternate with respect to test tracks across the magnetic recording medium.

22. A method according to claim 12, wherein the at least one reference track is adjacent the at least one test track.

23. A method according to claim 12, wherein the step of partially erasing comprises the step of DC erasing.

* * * * *